United States Patent
Huang et al.

(10) Patent No.: US 10,173,897 B2
(45) Date of Patent: Jan. 8, 2019

(54) METHOD OF SYNTHESIZING PHOSPHATE SALT OF HIGH PURITY

(71) Applicants: Guiqing Huang, Newton, MA (US); Boshan Mo, Newton, MA (US); Youde Mo, Newton, MA (US)

(72) Inventors: Guiqing Huang, Newton, MA (US); Boshan Mo, Newton, MA (US); Youde Mo, Newton, MA (US)

(*) Notice: Subject to any disclaimer, the term of this patent is extended or adjusted under 35 U.S.C. 154(b) by 35 days.

(21) Appl. No.: 15/586,715

(22) Filed: May 4, 2017

(65) Prior Publication Data

US 2017/0327376 A1    Nov. 16, 2017

Related U.S. Application Data

(60) Provisional application No. 62/334,129, filed on May 10, 2016.

(51) Int. Cl.
| | |
|---|---|
| *C01B 25/45* | (2006.01) |
| *C01B 25/37* | (2006.01) |
| *C01G 49/02* | (2006.01) |

(52) U.S. Cl.
CPC .......... *C01B 25/451* (2013.01); *C01B 25/375* (2013.01); *C01B 25/377* (2013.01); *C01B 25/45* (2013.01); *C01G 49/02* (2013.01); *C01P 2006/80* (2013.01)

(58) Field of Classification Search
CPC ..................................................... C01B 25/45
See application file for complete search history.

(56) References Cited

U.S. PATENT DOCUMENTS

| | | | |
|---|---|---|---|
| 5,030,285 A | * | 7/1991 | Vallvey ................ C09C 1/0081 106/14.05 |
| 2011/0068295 A1 | | 3/2011 | Beck et al. |
| 2014/0054494 A1 | | 2/2014 | Huang et al. |
| 2015/0108412 A1 | | 4/2015 | Buehler et al. |

* cited by examiner

*Primary Examiner* — Stuart L Hendrickson
(74) *Attorney, Agent, or Firm* — Guosheng Wang; United States Research and Patent Firm

(57) ABSTRACT

The present invention provides a cost-effective method of synthesizing phosphate salt of a metal such as Fe and Mn that can be used for electrode active material of a lithium secondary battery. A precipitation reaction is first carried out to produce a solid salt of the metal having a lower valence value, e.g. Fe(II) and Mn(II). The solid salt is then purified before it is oxidized to form the target phosphate salt of the metal having a higher valence value, e.g. Fe(III) and Mn(III). The invention exhibits numerous technical merits such as easier operation, higher purity, and less consumption of washing water, among others.

19 Claims, 11 Drawing Sheets

METHOD OF SYNTHESIZING PHOSPHATE SALT OF HIGH PURITY

CROSS-REFERENCE TO RELATED APPLICATIONS

This application claims priority to and the benefit of, pursuant to 35 U.S.C. Section 119(e), U.S. provisional patent application Ser. No. 62/334,129, filed May 10, 2016, entitled "PREPARATION OF METAL PHOSPHATE PRECURSOR OF ACTIVE CATHODE LIMPO$_4$ USING HIGH PURITY METAL PHOSPHATE MATERIAL" by Guiqing Huang, the disclosure of which is incorporated herein in their entirety by reference.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present invention generally relates to a method of synthesizing a high-purity phosphate salt of a metal. Although the invention will be illustrated, explained and exemplified by phosphate salts of Fe and Mn useful as an electrode active material for a lithium secondary battery, it should be appreciated that the present invention can also be applied to other fields.

BACKGROUND OF THE INVENTION

The microminiaturization of electronic components has created widespread growth in the use of portable electronic devices such as cellular phones, pagers, video cameras, facsimile machines, portable stereophonic equipment, personal organizers and personal computers. As a result, the demand of improved power sources for these devices has been increased. Moreover, telecommunication backup batteries, hybrid electric vehicles, and electric vehicles also require advanced battery materials to meet the high demand and performance. Preferably, the battery materials are environmentally benign and relatively low cost to make these expanded battery applications practical. Relevant batteries include primary batteries, i.e., batteries designed for use through a single charging cycle, and secondary batteries, i.e., batteries designed to be rechargeable. Some batteries designed essentially as primary batteries may be rechargeable to some extent.

Batteries based on lithium have been the subject of considerable development effort and are being sold commercially. Lithium-based batteries have become commercially successful due to their relatively high energy density. Lithium-based batteries generally use electrolytes containing lithium ions. The negative electrodes for these batteries can include lithium metal or alloy (lithium batteries), or compositions that intercalate lithium (lithium ion batteries). Preferred electroactive materials for incorporation into the positive electrodes are compositions that intercalate lithium. For example, metal phosphates are candidates for the production of cathode materials that intercalate lithium.

An example of lithium-ion battery is the lithium ferrophosphate (LiFePO$_4$, LFP) battery, in which LiFePO$_4$ is used as the cathode material. LFP exhibits some advantages such as low cost, non-toxicity, natural abundance, excellent thermal stability, safety characteristics, electrochemical performance, and specific capacity (170 mA·h/g, or 610 C/g). As such, LFP battery is even finding a number of roles in vehicle use and backup power, among others. However, LFP batteries are still expensive to produce. For instance, in order to manufacture LFP active material and its dopant, one major production method is using iron oxalate as Fe source precursor and NH$_4$H$_2$PO$_4$ as PO$_4$ source precursor. The drawback is that the manufacturing process for iron oxalate and NH$_4$H$_2$PO$_4$ generates hazardous gas, and the processing cost is very high. Another method is the use of fine quality iron phosphate as precursor for both Fe and PO$_4$ source. However, the manufacturing cost for iron phosphate is also very high.

The manufacture of FePO$_4$ also wastes a huge amount of water, and is therefore not environmentally friendly. More than one billion people in the world is water stressed, and do not have access to potable water. About 700 million people in 43 countries face water scarcity, since their annual water supplies drop below 1,000 cubic meters per person per year. In China, more than 538 million people are living in a water-stressed region.

Thus, there is a need of a new method or process of producing LFP and FePO$_4$ at a lower cost and using less water. Advantageously, the present invention provides a novel method of synthesizing a phosphate salt that can overcome the problem.

SUMMARY OF THE INVENTION

One aspect of the present invention provides a method of synthesizing a phosphate salt of a metal. The phosphate salt of the metal can be used in many applications, including active electrode composite materials. The method comprises: (i) providing an aqueous solution of the metal M having a first valence value Va (e.g. metal ion M$^{Va}$, such as Fe$^{2+}$), wherein the aqueous solution contains a first impurity Ta (such as SO$_4^{2-}$); (ii) adding a precipitating composition containing a second impurity Tb to the aqueous solution to form a mixture of a liquid phase and a precipitate composition comprising one or more water-insoluble compounds of the metal having a first valence value M(Va), wherein the liquid phase contains both the first impurity Ta and the second impurity Tb; (iii) separating the precipitate composition and the liquid phase, wherein a residual amount of the first impurity Ta and the second impurity Tb remains in the precipitate composition after the separation; (iv) decreasing the residual amount of the first impurity Ta and the second impurity Tb present in the precipitate composition; and (v) oxidizing the metal having a first valence value M(Va) in the precipitate composition with an oxidizing composition to produce a phosphate salt of the metal having a second valence value Vb, wherein the second valence value Vb is greater than the first valence value Va.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form, omitted, or merely suggested, in order to avoid unnecessarily obscuring the present invention.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

Where a numerical range is disclosed herein, unless otherwise specified, such range is continuous, inclusive of both the minimum and maximum values of the range as well as every value between such minimum and maximum values. Still further, where a range refers to integers, only the integers from the minimum value to and including the maximum value of such range are included. In addition, where multiple ranges are provided to describe a feature or characteristic, such ranges can be combined. As used in the description herein and throughout the claims that follow, the meaning of "a", "an", and "the" includes plural reference unless the context clearly dictates otherwise. In a reaction equation, "aq" stands for "aqueous", and "s" stands for solid. Also, as used in the description herein and throughout the claims that follow, the meaning of "in" includes "in" and "on" unless the context clearly dictates otherwise.

In various embodiments, the present invention provides a method of synthesizing a phosphate salt of a metal M. Examples of the metal M includes, but is not limited to, any suitable metal that has multiple (e.g. two) valence values such as Fe, Co, Ni, Mn, Ti, V, or any combination thereof. In specific embodiments, metal M includes, but is not limited to, a transitional metal with multiple valence values such as Fe, Mn, Co, Ni, or any combination thereof.

The term "multiple valence values" is intended to mean that metal M has at least two valence value, defined as a first valence value Va and a second valence value Vb. The second valence value Vb is greater than the first one Va. Vb is an integer greater than 1. Va may be 1, 2, 3, 4, and 5 etc., while Vb may be 2, 3, 4, 5 and 6 etc. For example, Va of Fe, Co, Ni and Mn may be II or +2, and Vb of Fe, Co, Ni and Mn may be III or +3. The present invention provides a method of synthesizing a phosphate salt of a metal M that has the second valence value Vb, represented as M(Vb), M(+Vb), $M^{Vb}$ or $M^{+Vb}$. The salt can therefore be represented as $M_3(PO_4)_{Vb}$.

Figure 1:
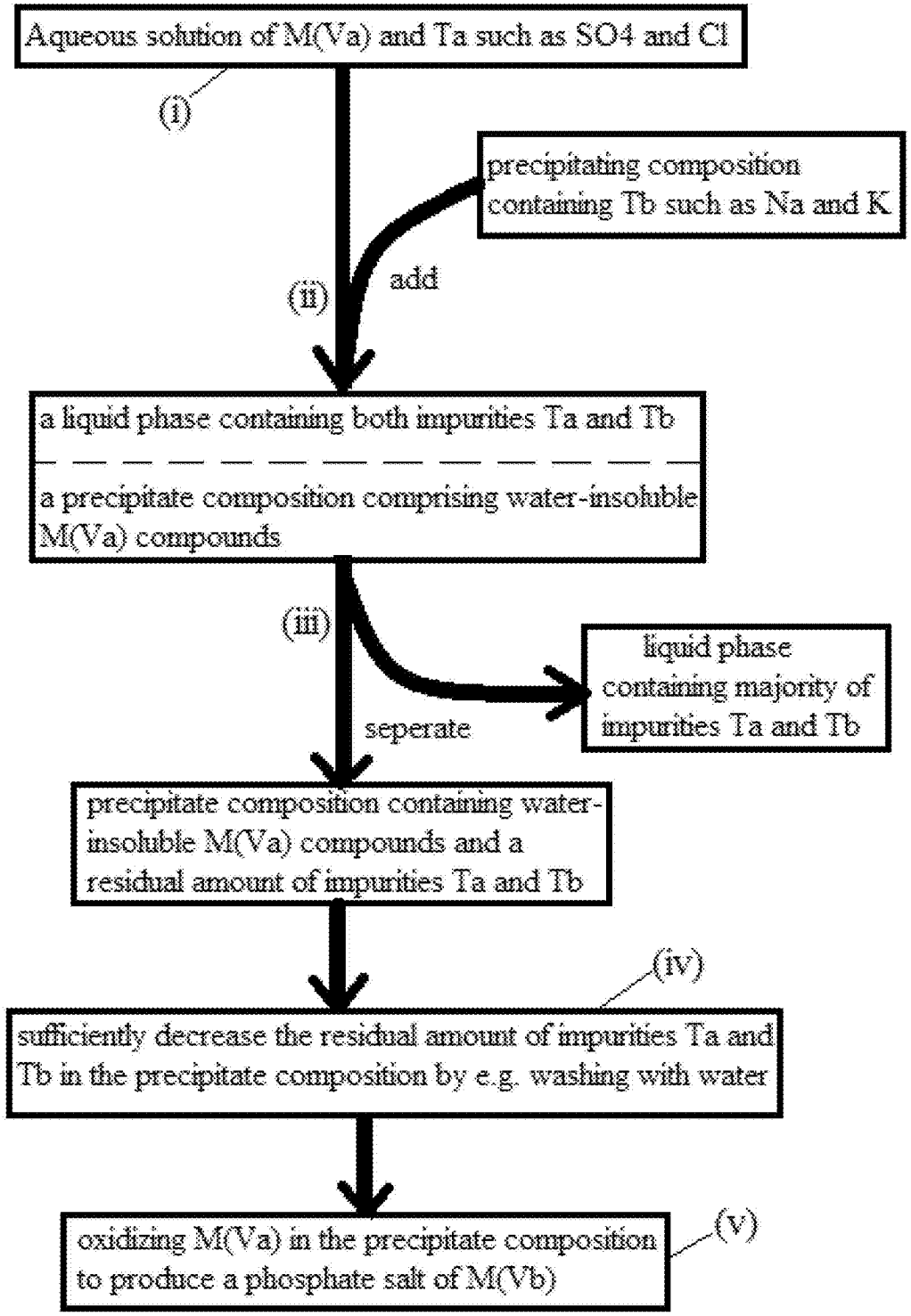
FIG. 1 schematically illustrates a method of synthesizing a phosphate salt of a metal in accordance with an exemplary embodiment of the present invention.

As shown in FIG. 1, the general method of the present invention comprises at least five steps. Step (i) is providing an aqueous solution of the metal M having a first valence value Va, for short, M(Va). The aqueous solution contains a first impurity Ta. For example, M(Va) can be $Fe^{2+}$, and Ta can be $SO_4^{2-}$ and/or $Cl^-$. Such an aqueous solution can be prepared from dissolving $FeSO_4$ and/or $FeCl_2$ in water. Step (ii) may be a precipitation reaction, in which a precipitating composition containing a second impurity Tb is added to the aqueous solution to form a mixture of a liquid phase and a precipitate composition. For example, when the precipitating composition comprises NaOH and/or $Na_2CO_3$, Tb is $Na^+$. After the precipitation, the precipitate composition comprises one or more water-insoluble compounds of M(Va), such as $Fe(OH)_2$ and/or $FeCO_3$. Now, the liquid phase contains both the first impurity Ta such as $SO_4^{2-}$ and/or $Cl^-$ and the second impurity Tb such as $Na^+$. Step (iii) is separating the precipitate composition and the liquid phase (or water phase). The majority of both the first impurity Ta (such as $SO_4^{2-}$ and/or $Cl^-$) and the second impurity Tb (such as $Na^+$) will be contained in the liquid phase. Ta and Tb will be carried in the liquid phase after the separation, and removed away from the precipitate composition. The term "majority" can mean at least 50%, at least 60%, at least 70%, at least 80%, at least 90%, or at least 95% of Ta and Tb. However, a residual amount of the first impurity Ta such as $SO_4^{2-}$ and/or $Cl^-$ and the second impurity Tb such as $Na^+$ may remain in the precipitate composition (commonly the "solid phase"). Step (iv) is further decreasing the residual amount of the first impurity Ta such as $SO_4^{2-}$ and/or $Cl^-$ and the second impurity Tb such as $Na^+$ present in the precipitate composition, by e.g. washing the composition with DI water for one or more times. Step (v) is oxidizing the metal M(Va) compounds in the precipitate composition such as $Fe(OH)_2$ and/or $FeCO_3$ with an oxidizing composition to produce $M_3(PO_4)_{Vb}$, i.e. a phosphate salt of the metal having a second valence value Vb, wherein the second valence value Vb is greater than the first valence value Va, Vb>Va. An example of $M_3(PO_4)_{Vb}$ is $Fe_3(PO_4)_3$, or simply $FePO_4$.

Figure 2:
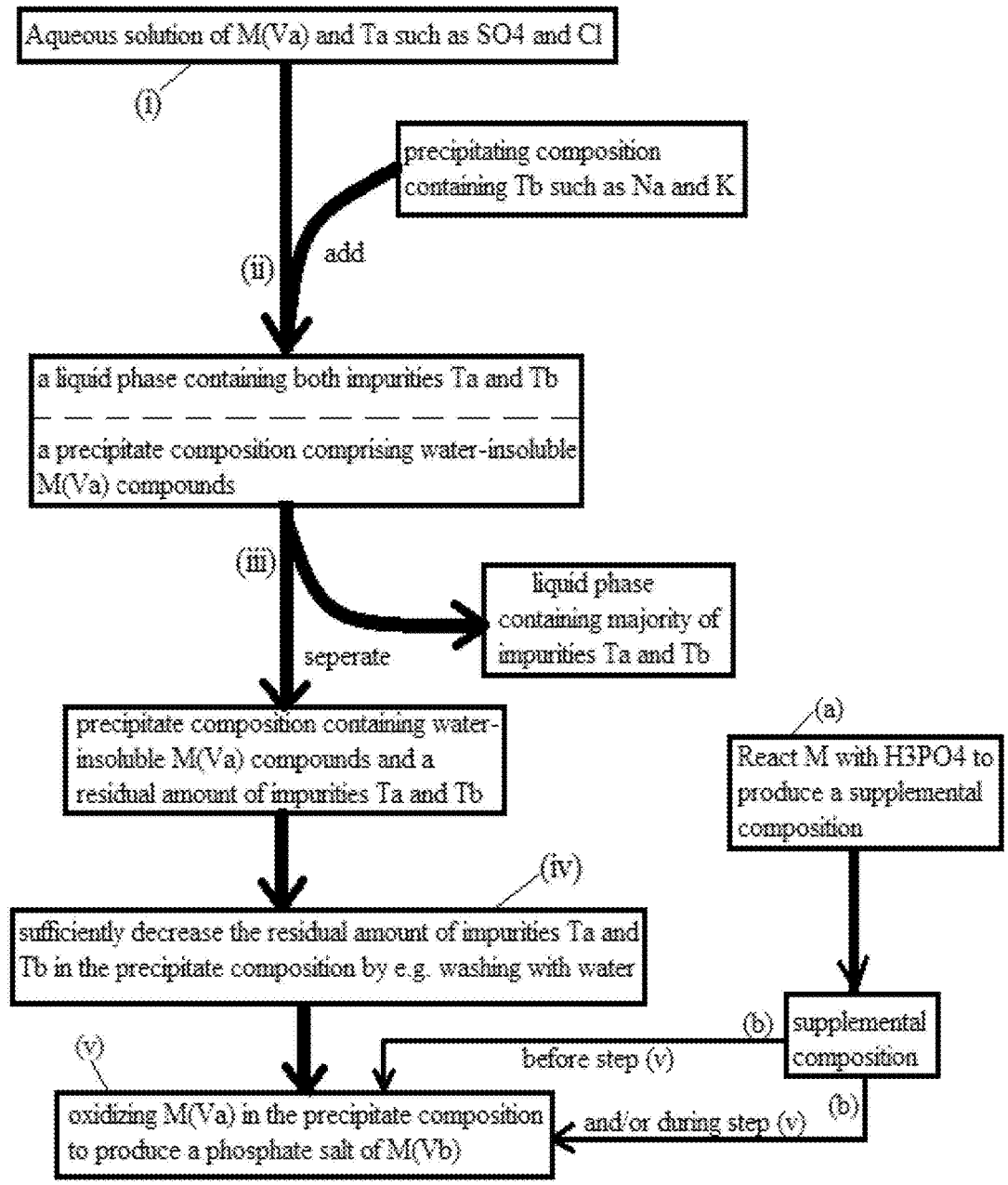
FIG. 2 schematically illustrates another method of synthesizing a phosphate salt of a metal in accordance with an exemplary embodiment of the present invention.

In some embodiments, the method as shown in FIG. 1 may further include two extra steps. Referring to FIG. 2, the two extra steps are steps (a) and (b). Step (a) is reacting the metal M in substantially pure element form such as metal iron Fe with phosphoric acid $H_3PO_4$ to produce a supplemental composition. In chemistry, a pure element means a substance whose atoms all (or in practice almost all) have the same atomic number, or number of protons. The term "substantially pure" means the purity of the metal is such that it will not introduce an amount of any undesirable impurity into the product of step (iv) as described above in FIG. 1 that needs to be removed by an additional step. The metal purity may be at least 99%, at least 99.9%, at least 99.99%, at least 99.999%, at least 99.9999%, or at least 99.99999%. The supplemental composition may include phosphoric acid, a phosphate salt of the metal having a first valence value $M_3(PO_4)_{Va}$, a hydrogen phosphate salt of the metal having a first valence value $M_2(HPO_4)_{Va}$, a dihydrogen phosphate salt of the metal having a first valence value $M(H_2PO_4)_{Va}$, or any mixture thereof. For example, the supplemental composition may include $H_3PO_4$, $Fe(H_2PO_4)_2$, $FeHPO_4$, $Fe_3(PO_4)_2$, or any mixture thereof. Step (b) is mixing the supplemental composition with the precipitate composition after step (iv), but before step (v) and/or during step (v). The metal M(Va) in the supplemental composition, like the metal M(Va) compounds in the precipitate composition, will be oxidized with the oxidizing composition to produce $M_3(PO_4)_{Vb}$ in step (v).

As described above, the present invention provides a method of synthesizing a phosphate salt of a metal M. Examples of the metal M includes, but is not limited to, any suitable metal that has multiple (e.g. two) valence values such as Fe, Co, Ni, Mn, Ti, V, or any combination thereof. The term "any combination thereof" is intended to mean that two metals M1 and M2 or more are present in the phosphate salt (a "co-salt") product of M1(Vb1) and M2(Vb2), for example, $Fe(III)_x Mn(III)_{(1-x)}PO_4$, wherein 0<x<1.

Figure 3:
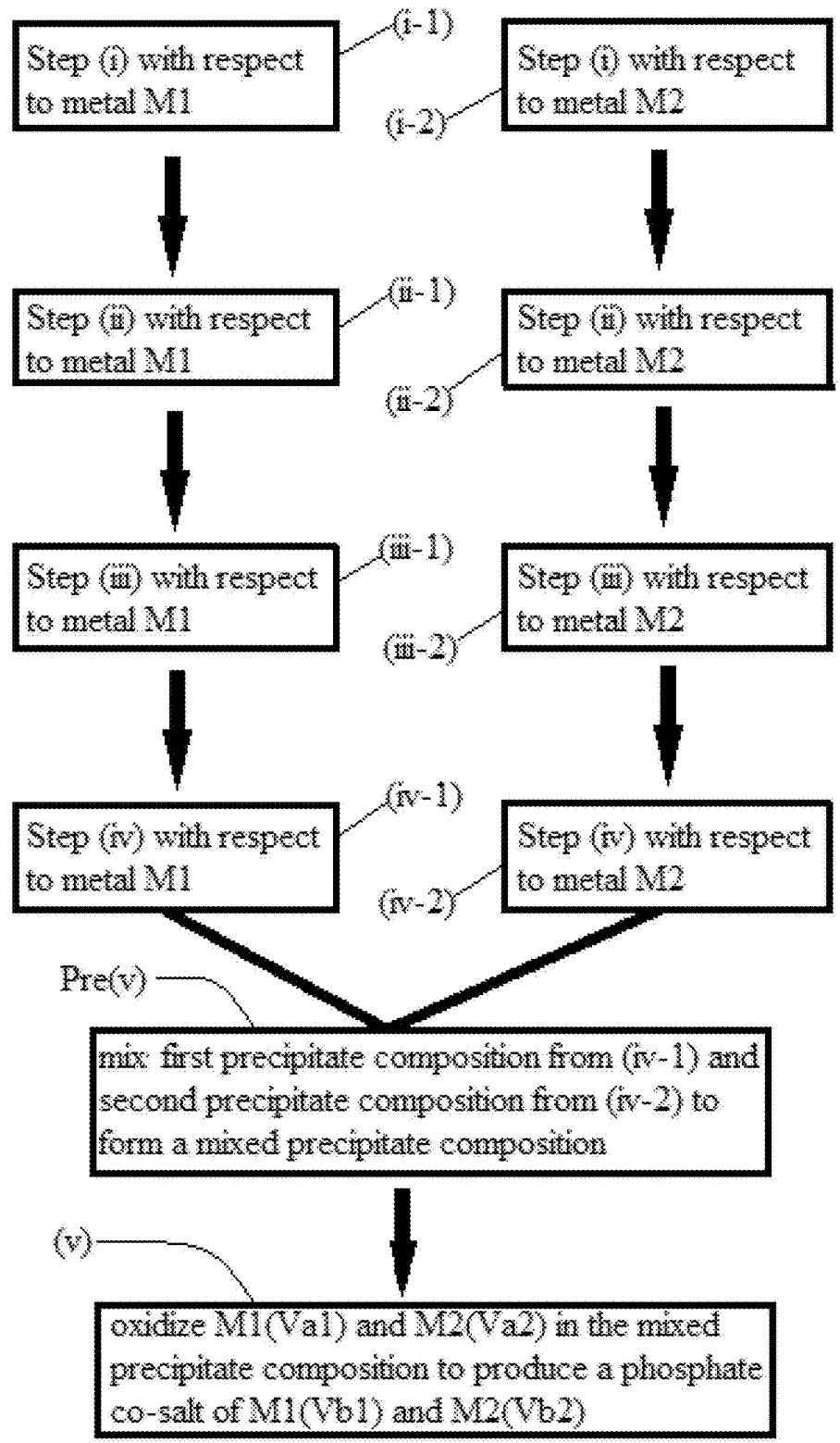
FIG. 3 schematically illustrates a method of synthesizing a phosphate co-salt of two or more metals in accordance with an exemplary embodiment of the present invention.

As shown in FIG. 3, the present invention provides a general method of synthesizing a phosphate co-salt of two metals M1 and M2. In one branch of the method, step (i-1) is providing a first aqueous solution of the metal M1 having a first valence value Va1, for short, M1(Va1). The first aqueous solution contains a first impurity Ta1. For example, M1(Va1) can be $Fe^{2+}$, and Ta1 can be $SO_4^{2-}$ and/or $Cl^-$. Such an aqueous solution can be prepared from dissolving $FeSO_4$ and/or $FeCl_2$ in water. In other words, step (i-1) is essentially the same as step (i) of FIG. 1 with respect to metal M1. Step (ii-1) may be a precipitation reaction, in which a first precipitating composition containing a second impurity Tb1 is added to the first aqueous solution to form a mixture of a first liquid phase and a first precipitate composition. For example, when the first precipitating composition comprises NaOH and/or $Na_2CO_3$, Tb1 is $Na^+$. After the precipitation, the first precipitate composition may include one or more water-insoluble compounds of M1(Va1), such as $Fe(OH)_2$ and/or $FeCO_3$. Now, the liquid phase contains both the first impurity Ta1 such as $SO_4^{2-}$ and/or $Cl^-$, and the second impurity Tb1 such as $Na^+$. In other words, step (ii-1) is essentially the same as step (ii) of FIG. 1 with respect to metal M1. Step (iii-1) is separating the first precipitate composition and the first liquid phase or the first water phase. The majority of the first impurity Ta1 such as $SO_4^{2-}$ and/or $Cl^-$ and the second impurity Tb1 such as $Na^+$ will be contained in the liquid phase, and will be removed away from the first precipitate composition, after the separation. The term "majority" can mean at least 50%, at least 60%, at least 70%, at least 80%, at least 90%, or at least 95%. However, a residual amount of the first impurity Ta1 such as $SO_4^{2-}$ and/or $Cl^-$ and the second impurity Tb1 such as $Na^+$ will remain in the first precipitate composition, or commonly the "solid phase". In other words, step (iii-1) is essentially the same as step (iii) of FIG. 1 with respect to metal M1. Step (iv-1) is further decreasing the residual amount of the first impurity Ta1 such as $SO_4^{2-}$ and/or $Cl^-$ and the second impurity Tb1 such as $Na^+$ present in the first precipitate composition, by e.g. washing the composition with deionized (DI) water for one or more times, and as many times as desired. In other words, step (iv-1) is essentially the same as step (iv) of FIG. 1 with respect to metal M1.

In another branch of the method as shown in FIG. 3, step (i-2) is providing a second aqueous solution of the metal M2 having a first valence value Va2, for short, M2(Va2). The second aqueous solution contains a first impurity Ta2. For example, M2(Va2) can be $Mn^{2+}$, and Ta2 can be $SO_4^{2-}$ and/or $Cl^-$. Such an aqueous solution can be prepared from dissolving $MnSO_4$ and/or $MnCl_2$ in water. In other words, step (i-2) is essentially the same as step (i) of FIG. 1 with respect to metal M2. Step (ii-2) may be a precipitation reaction, in which a second precipitating composition containing a second impurity Tb2 is added to the second aqueous solution to form a mixture of a second liquid phase and a second precipitate composition. For example, when the second precipitating composition comprises NaOH and/or $Na_2CO_3$, Tb2 is $Na^+$. After the precipitation, the second precipitate composition comprises one or more water-insoluble compounds of M2(Va2), such as $Mn(OH)_2$ and/or $MnCO_3$. Now, the second liquid phase contains both the first impurity Ta2 such as $SO_4^{2-}$ and/or $Cl^-$, and the second impurity Tb2 such as $Na^+$. In other words, step (ii-2) is essentially the same as step (ii) of FIG. 1 with respect to metal M2. Step (iii-2) is separating the second precipitate composition and the second liquid phase or water phase. The majority of the first impurity Ta2 such as $SO_4^{2-}$ and/or $Cl^-$ and the second impurity Tb2 such as $Na^+$ will be contained in the second liquid phase, and will be removed away from the second precipitate composition, after the separation. The term "majority" can mean at least 50%, at least 60%, at least 70%, at least 80%, at least 90%, or at least 95%. However, a residual amount of the first impurity Ta2 such as $SO_4^{2-}$ and/or $Cl^-$ and the second impurity Tb2 such as $Na^+$ will remain in the second precipitate composition, or commonly the "solid phase". In other words, step (iii-2) is essentially the same as step (iii) of FIG. 1 with respect to metal M2. Step (iv-2) is further decreasing the residual amount of the first impurity Ta2 such as $SO_4^{2-}$ and/or $Cl^-$ and the second impurity Tb2 such as $Na^+$ present in the second precipitate composition, by e.g. washing the composition with DI water for one or more times, or as many times as desired. In other words, step (iv-2) is essentially the same as step (iv) of FIG. 1 with respect to metal M2.

Next, step (pre-v) is mixing the first precipitate composition obtained from step (iv-1) and the second precipitate composition obtained from step (iv-2) to form a mixed precipitate composition. Step (v) is oxidizing the first metal and the second metal having their first valence values, i.e. M1(Va1) and M2(Va2), in the mixed precipitate composition with an oxidizing composition to produce a phosphate co-salt of the first metal and the second metal having their second valence values M1(Vb1) and M2(Vb2), i.e. $M1_uM2_v(PO_4)_w$, wherein u>0, v>0, w>0, and u×Vb1+v×Vb2=w×3. The second valence value Vb1 is greater than the first valence value Va1, and the second valence value Vb2 is greater than the first valence value Va2. An example of the product is $Fe(III)_xMn(III)_{(1-x)}PO_4$, wherein 0<x<1.

Figure 4:
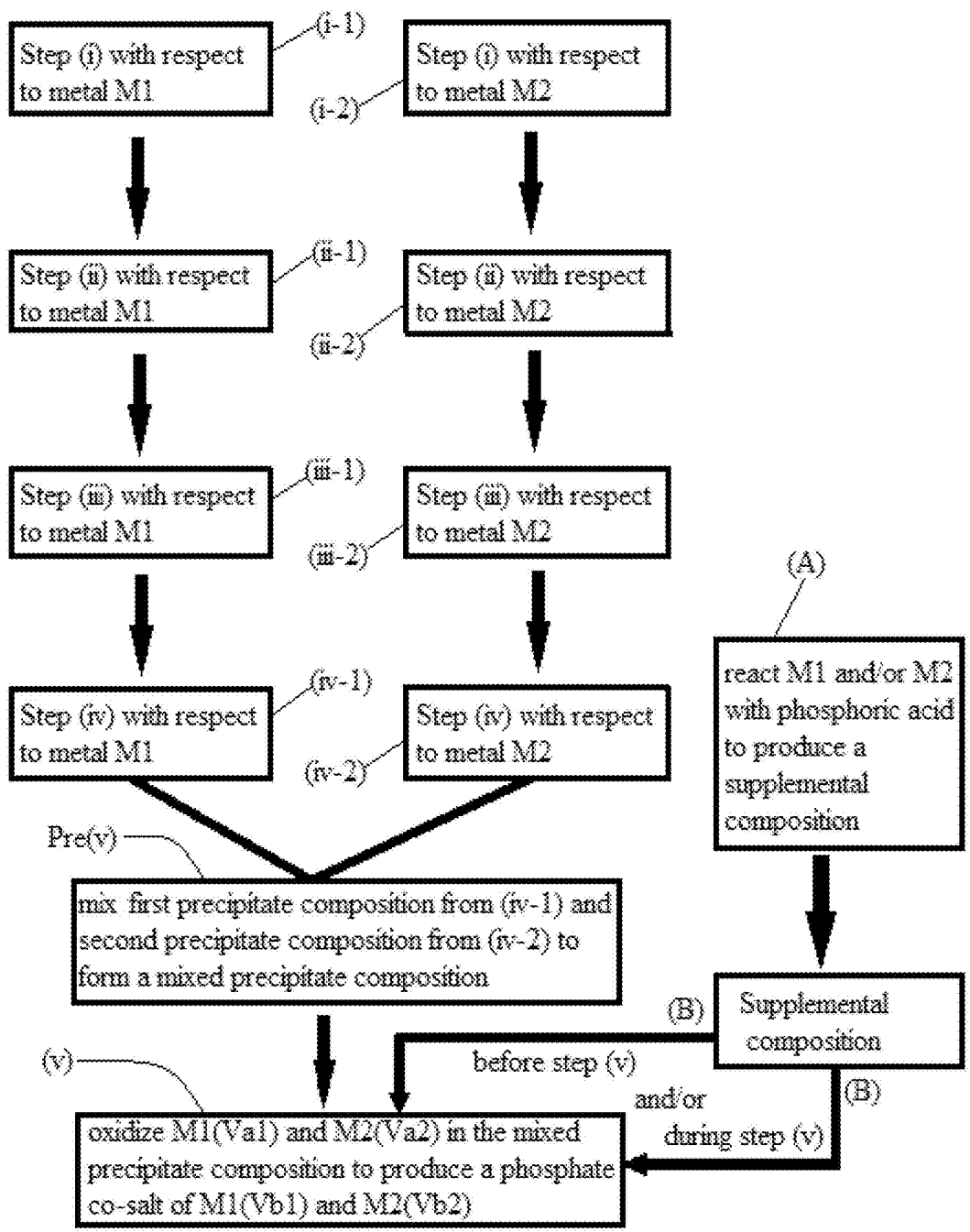
FIG. 4 schematically illustrates another method of synthesizing a phosphate co-salt of two or more metals in accordance with an exemplary embodiment of the present invention.

In some embodiments, the method as shown in FIG. 3 may further include two extra steps. Referring to FIG. 4, the two extra steps are steps (A) and (B). Step (A) is reacting the metals M1 and/or M2 in substantially pure element form such as metal Fe and Mn with phosphoric acid $H_3PO_4$ to produce a supplemental composition. The term "substantially pure" means the purity of the metal e.g. Fe or Mn is such that it will not introduce an amount of any undesirable impurity into the product of step (iv-1) and/or step (iv-2) as described above that needs to be removed by an additional step. The metal purity may be at least 99%, at least 99.9%, at least 99.99%, at least 99.999%, at least 99.9999%, or at least 99.99999%. The supplemental composition may comprise phosphoric acid, a phosphate salt of the first metal M1 having a first valence value Va1, a hydrogen phosphate salt of the first metal M1 having a first valence value Va1, a dihydrogen phosphate salt of the first metal M1 having a first valence value Va1, a phosphate salt of the second metal M2 having a first valence value Va2, a hydrogen phosphate salt of the second metal M2 having a first valence value Va2, a dihydrogen phosphate salt of the second metal M2 having a first valence value Va2, or any mixture thereof. For example, the supplemental composition may include $H_3PO_4$, $Fe(H_2PO_4)_2$, $FeHPO_4$, $Fe_3(PO_4)_2$, $Mn(H_2PO_4)_2$, $MnHPO_4$, $Mn_3(PO_4)_2$, or any mixture thereof. Step (B) is mixing the supplemental composition with the mixed precipitate composition after step (pre-v), but before step (v) and/or during step (v). The metal M1(Va1) and/or M2(Va2) in the supplemental composition, like the metal M1(Va1) and/or M2(Va2) compounds in the precipitate composition, will be oxidized by the oxidizing composition to produce $M1_uM2_v(PO_4)_w$, in step (v), wherein u>0, v>0, w>0, and u×Vb1+v×Vb2=w×3.

The embodiments as shown in FIGS. 3 and 4 are particularly suitable, when the conditions for the reaction conditions for M1 and M2, for example, precipitation reactions in step (ii-1) and step (ii-2) are different from each other. For instance, the pH used in the precipitation reaction of step (ii-1) may be different from the pH used in the precipitation reaction of step (ii-2). Otherwise, a single aqueous solution of M1(Va1) and M2(Va2) may be prepared in step (i) as shown in FIGS. 1 and 2, which can then be subject to the precipitation reaction, the separation, the washing treatment, and the oxidization etc. in the following steps (ii)~(v).

Embodiments of Step (i)/(i-1)/(i-2)

In step (i)/(i-1)/(i-2), an aqueous solution of the metal M having a first valence value M(Va), represented as M(Va), or $M^{+Va}$, is provided. The aqueous solution is a solution in which the solvent is water. It is usually shown in chemical equations by appending (aq) to the relevant chemical formula. For example, a solution of table salt or sodium chloride (NaCl) in water is represented as $Na^+$ (aq)+$Cl^-$ (aq). The word aqueous means pertaining to, related to, similar to, or dissolved in water. The aqueous solution in step (i) of the present invention contains $M^{+Va}$(aq). The counter ions of the metal cations $M^{+Va}$(aq) may include one or more anions selected from $SO_4^{2-}$, $Cl^-$, and any other suitable anions. In embodiments, the aqueous solution of M(Va) in step (i)/(i-1)/(i-2) includes a sulfate salt of M(Va), a chloride salt of M(Va), or any mixture thereof.

The aqueous solution in step (i)/(i-1)/(i-2) contains a level of a first impurity. The term "first impurity" is defined relative to the final product of the entire process, i.e. the phosphate salt of M(Vb) in or after step (iv), and not relative to the aqueous solution in step (i)/(i-1)/(i-2). The first impurity is not necessarily an impurity for the aqueous solution in step (i)/(i-1)/(i-2). For example, the aqueous solution in step (i)/(i-1)/(i-2) may be a solution of $FeSO_4$, $FeCl_2$, $MnSO_4$, $MnCl_2$, or any mixture thereof. In this example, $SO_4^{2-}$ and/or $Cl^-$ (or "S and/or Cl") is/are actually the major component(s) in the aqueous solution, but it is (they are) the first impurity for the final product of the method, i.e. the phosphate salt of metal M(Vb).

Embodiments of Step (ii)/(ii-1)/(ii-2)

Step (ii)/(ii-1)/(ii-2) is adding a precipitating composition to the aqueous solution from step (i)/(i-1)/(i-2) to form an precipitate composition comprising one or more water-insoluble compounds of the metal M(Va). In various embodiments, the precipitating composition may be in solid form, liquid form (e.g. an aqueous solution), or a mixture of solid and liquid. The precipitating composition comprises a phosphate salt, a hydrogen phosphate salt, or any mixture thereof, and may therefore constitute a source of phosphate ion $PO_4^{3-}$ in the final product of the entire process, i.e. the phosphate salt of M(Vb) in or after step (v). In some embodiments, the precipitating composition comprises a phosphate salt of A, a hydrogen phosphate salt of A, a hydroxide of A, a carbonate of A, an oxalate salt of A, or any mixture thereof. Examples of element A include, but are not limited to $NH_4$; an alkali metal ion such Na, K, Rb, Cs, Li; or any mixture thereof. In preferred embodiments, $A^+$ is $NH_4^+$, $Na^+$, $K^+$, or any mixture thereof.

The precipitating composition may include a level of a second impurity. The term "second impurity" is also defined relative to the final product of the entire process, i.e. the phosphate salt of M(Vb) in or after step (v). It is not defined relative to the precipitating composition in step (ii)/(ii-1)/(ii-2), or the reaction mixture it formed with the aqueous solution in step (i)/(i-1)/(i-2). For example, element A such as Li, Na, K, Rb, Cs, $NH_4$, or a mixture thereof is (are) actually the major component(s) (not an impurity) in the precipitating composition first, but it/they will become the second impurity for the final product of the method, i.e. the phosphate salt of metal M(Vb). In preferred embodiments, $A^+$ is $NH_4^+$, an alkali metal ion such as $Na^+$ and $K^+$, or any mixture thereof. As a result, the second impurity is $NH_4^+$, an alkali metal ion such as $Na^+$ and $K^+$, or any mixture thereof.

In step (ii)/(ii-1)/(ii-2), when the precipitating composition is added to the aqueous solution from step (i)/(i-1)/(i-2), a precipitation reaction takes place to convert a reaction mixture that includes a liquid phase or aqueous phase, and a precipitate phase or a solid phase defined as an precipitate composition. In the precipitation process, the valence value Va of M is maintained the same when possible without further oxidization or with minimal oxidization. The liquid phase may have pH greater than 4, such as 5-10 and 6-8. The precipitate composition may contain one or more water-insoluble compounds of the metal M(Va) selected from a phosphate salt of the metal M(Va), a hydrogen phosphate salt of the metal M(Va), a hydroxide of the metal M(Va), a carbonate of the metal M(Va), the metal salt of $NH_4PO_4^{2-}$, and an oxalate salt of the metal M(Va). The liquid phase now contains a large amount of the first impurity and the second impurity.

Exemplary reactions in step (ii)/(ii-1)/(ii-2) include, but are not limited to, one or more of the following reactions, wherein (s) stands for (solid):

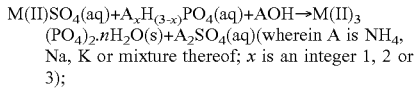
M(II)SO$_4$(aq)+A$_x$H$_{(3-x)}$PO$_4$(aq)+AOH→M(II)$_3$(PO$_4$)$_2$.nH$_2$O(s)+A$_2$SO$_4$(aq)(wherein A is NH$_4$, Na, K or mixture thereof; x is an integer 1, 2 or 3);

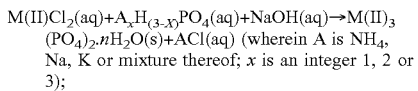
M(II)Cl$_2$(aq)+A$_x$H$_{(3-x)}$PO$_4$(aq)+NaOH(aq)→M(II)$_3$(PO$_4$)$_2$.nH$_2$O(s)+ACl(aq) (wherein A is NH$_4$, Na, K or mixture thereof; x is an integer 1, 2 or 3);

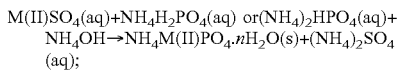
M(II)SO$_4$(aq)+NH$_4$H$_2$PO$_4$(aq) or(NH$_4$)$_2$HPO$_4$(aq)+NH$_4$OH→NH$_4$M(II)PO$_4$.nH$_2$O(s)+(NH$_4$)$_2$SO$_4$(aq);

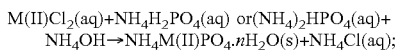
M(II)Cl$_2$(aq)+NH$_4$H$_2$PO$_4$(aq) or(NH$_4$)$_2$HPO$_4$(aq)+NH$_4$OH→NH$_4$M(II)PO$_4$.nH$_2$O(s)+NH$_4$Cl(aq);

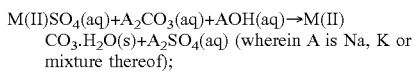
M(II)SO$_4$(aq)+A$_2$CO$_3$(aq)+AOH(aq)→M(II)CO$_3$.H$_2$O(s)+A$_2$SO$_4$(aq) (wherein A is Na, K or mixture thereof);

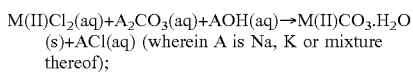
M(II)Cl$_2$(aq)+A$_2$CO$_3$(aq)+AOH(aq)→M(II)CO$_3$.H$_2$O(s)+ACl(aq) (wherein A is Na, K or mixture thereof);

M(II)SO$_4$(aq)+AOH→M(II)(OH)$_2$.nH$_2$O(s)+A$_2$SO$_4$(aq) (wherein A is Na, K or mixture thereof);

M(II)Cl$_2$(aq)+AOH→M(II)(OH)$_2$.nH$_2$O(s)+ACl(aq) (wherein A is Na, K or mixture thereof);

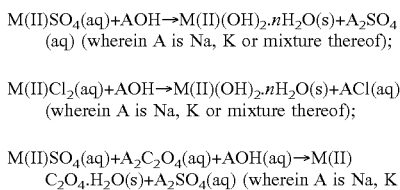
M(II)SO$_4$(aq)+A$_2$C$_2$O$_4$(aq)+AOH(aq)→M(II)C$_2$O$_4$.H$_2$O(s)+A$_2$SO$_4$(aq) (wherein A is Na, K or mixture thereof); and

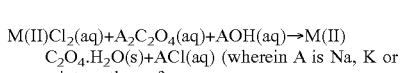
M(II)Cl$_2$(aq)+A$_2$C$_2$O$_4$(aq)+AOH(aq)→M(II)C$_2$O$_4$.H$_2$O(s)+ACl(aq) (wherein A is Na, K or mixture thereof).

Embodiments of Step (iii)/(iii-1)/(iii-2)

In this step, the liquid phase is separated from the reaction mixture formed in step (ii)/(ii-1)/(ii-2) using any known chemical separation techniques, such as filtering. After the separation, the precipitate composition may become a solid amorphous and/or crystallized material. However, it should be appreciated that there remains a level of the first impurity residue and a level of the second impurity residue in the precipitate composition.

For example, the residual amount of the first impurity and the second impurity that remains in the precipitate composition after the separation may be less than 40%, 30%, 20%, 10%, or 5% of the total amount of the first impurity and the second impurity in the reaction mixture before the separation.

Embodiments of Step (iv)/(iv-1)/(iv-2)

This step is to decrease the level of the first impurity and the level of the second impurity in the precipitate composition that has been separated from the reaction mixture of step (iii)/(iii-1)/(iii-2). In certain embodiments, this step may be carried out by washing the one or more water-insoluble compounds of the metal M(Va) with DI water for one or more times until the total amount of the first impurity and the second impurity present in the precipitate composition drops lower than a predetermined level. The predetermined level depends on specific product requirement, and it can be lower than <5000 ppm, <2000 ppm, <1000 ppm, <500 ppm, or <200 ppm.

In preferred embodiments, the washing DI water used in this step is dramatically reduced compared to the washing step in other method in the prior art, the present invention therefore exhibits technical merits such as less consumption of natural resource, and cost-effectiveness.

Embodiments of Step (v)

Step (v) is oxidizing the metal M(Va) present in the high purity product from step (iv)/(iv-1)/(iv-2), to produce a phosphate salt of the metal (M(Vb), wherein Vb>Va. In some embodiments, the oxidization may be carried out with an oxidizing composition comprising hydrogen peroxide, phosphoric acid, and water, at an elevated temperature such as >50° C., e.g. 50-120° C. The pH of reaction mixture in step (v) may go down to as low as 0.5, such as 0.5-1, 0.5-1.5, 1.5-2.5, 1-2, 2.5-3.5, 2-3, or 3-4. In preferred embodiment, step (v) does not increase the level of the first impurity and the level of the second impurity in the reaction mixture.

In preferred embodiments, the final product, i.e. the phosphate salt of the metal having a second valence value, such as M$_3$(PO$_4$)$_{Vb}$ or M1$_u$M2$_v$(PO$_4$)$_w$ (wherein u>0, v>0, w>0, and u×Vb1+v×Vb2=w×3), contains 50-500 ppm of the first impurity and the second impurity combined.

Figure 5:
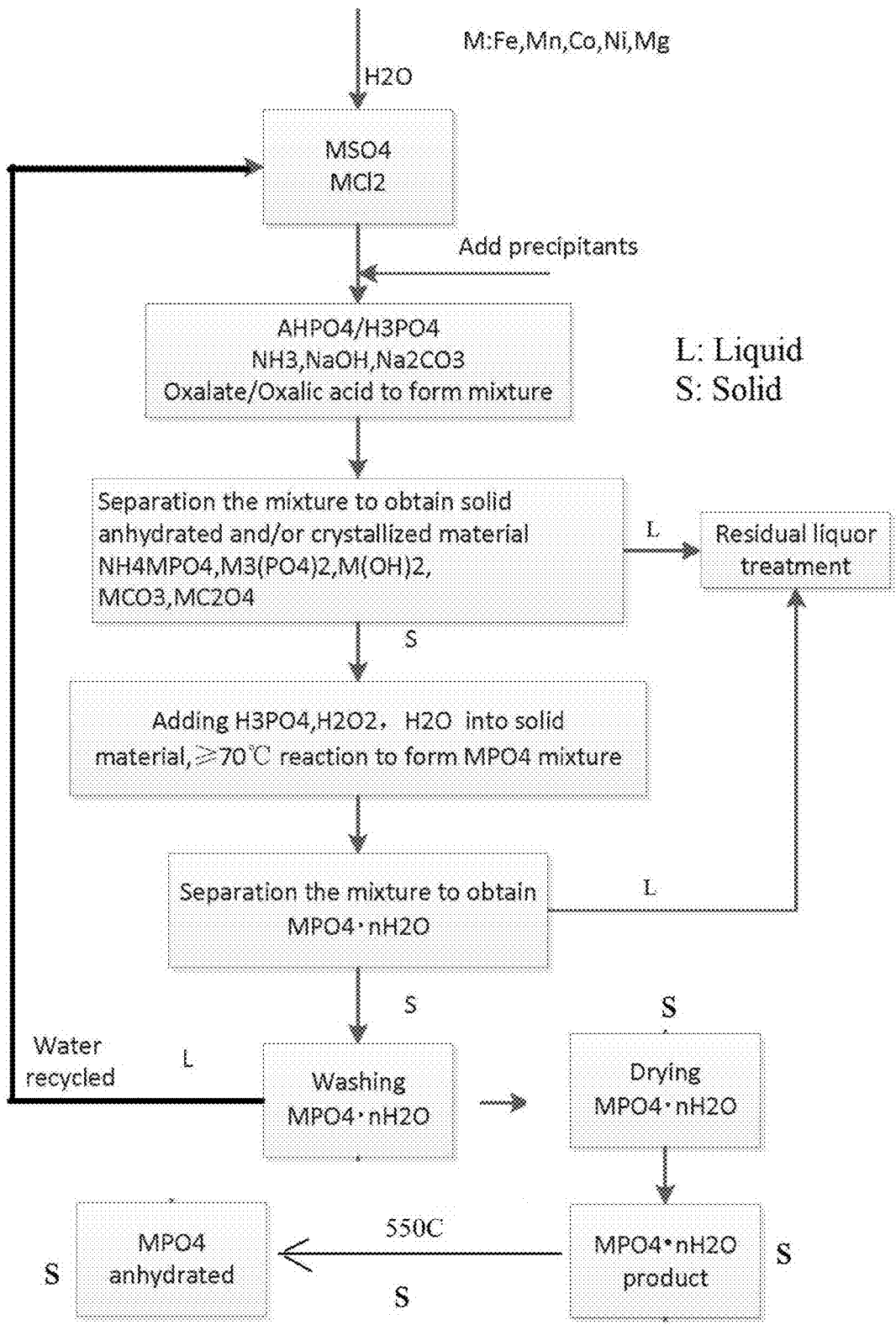
FIG. 5 schematically illustrates a specific method of synthesizing a phosphate salt of a metal (Fe, Co, Ni or Mn) in accordance with an exemplary embodiment of the present invention.

In some specific embodiments as shown in FIG. 5, a mixture of H$_3$PO$_4$, H$_2$O$_2$, and H$_2$O is added to the precipitate composition that has been purified/washed in step (iv)/(iv-1)/(iv-2) at a temperature greater than 70° C., to form a reaction mixture comprising M(Vb)PO$_4$. The reaction mixture is separated into M(Vb)PO$_4$.nH$_2$O solid phase, and a liquid phase which is subject to residual liquid treatment. M(Vb)PO$_4$.nH$_2$O is then washed with DI water, and the waste water may be recycled, and used in step (i)/(i-1)/i-2) for dissolving e.g. M(II)SO$_4$ and M(II)Cl$_2$. M(Vb)PO$_4$.nH$_2$O is then dried to obtain cleaner M(Vb)PO$_4$.nH$_2$O. M(Vb)PO$_4$.nH$_2$O may be converted into anhydrated M(Vb)PO$_4$ by heating at an elevated temperature such as 250-850° C.

Exemplary reactions in step (v) include, but are not limited to, one or more of the following reactions:

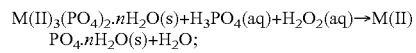
M(II)$_3$(PO$_4$)$_2$.nH$_2$O(s)+H$_3$PO$_4$(aq)+H$_2$O$_2$(aq)→M(II)PO$_4$.nH$_2$O(s)+H$_2$O;

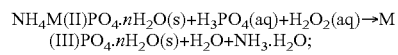
NH$_4$M(II)PO$_4$.nH$_2$O(s)+H$_3$PO$_4$(aq)+H$_2$O$_2$(aq)→M(III)PO$_4$.nH$_2$O(s)+H$_2$O+NH$_3$.H$_2$O;

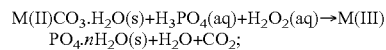
M(II)CO$_3$.H$_2$O(s)+H$_3$PO$_4$(aq)+H$_2$O$_2$(aq)→M(III)PO$_4$.nH$_2$O(s)+H$_2$O+CO$_2$;

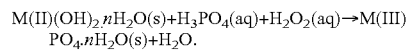
M(II)(OH)$_2$.nH$_2$O(s)+H$_3$PO$_4$(aq)+H$_2$O$_2$(aq)→M(III)PO$_4$.nH$_2$O(s)+H$_2$O.

In various embodiments, the phosphate salt of M(Vb) as the final product may contain less than 500 ppm of the first and second impurities, e.g. <300 ppm, <100 ppm, and <50 ppm. These impurities can be measured using any technique, instrument, and method as known to a skilled artisan in the field. For example, the level of Na and K can be measured by ICP metal analysis, or atomic absorption spectroscopy.

In certain embodiments, the pH value of the reaction mixture in step (v) is maintained between 1.0 and 2.0. In certain embodiments, the temperature of the solution in this step is maintained above 50° C., above 70° C., above 80° C., above 90° C., above 95° C., or above 100° C. In this step, according to the requirements of the product and manufacturing process, the S and Cl may be controlled to be less than about 100 ppm, or less than 80 ppm, or less than 50 ppm, or even lower than that. The amount of S and Cl may be measured using high frequency IR C and S analyzer, and chlorine ion analyzer, as known to a skilled artisan in the field.

In embodiments, the phosphate salt of M(Vb) as the final product in crystal form, in amorphous form, or in a mixture of the two.

In preferred embodiments, the phosphate salt of M(Vb) as the final product is $Fe_xMn_{(1-x)}PO_4$, wherein $0 \leq x \leq 1$.

Embodiments of Additional Steps (a)/(A) and (b)/(B)

In some embodiments, the method of the invention may optionally include two extra steps, (a)/(A) and (b)/(B). Use steps (a) and (b) to illustrate the points that can apply to steps (A)/(B), mutatis mutandis. Step (a) is reacting the metal in substantially pure element form with phosphoric acid to produce a supplemental composition comprising a phosphoric acid, a phosphate salt of the metal having a first valence value, a hydrogen phosphate salt of the metal having a first valence value, a dihydrogen phosphate salt of the metal having a first valence value, or any mixture thereof. Step (b) is mixing the supplemental composition with the precipitate composition after step (iv), but before step (v) and/or during step (v). In this case, the supplemental composition preferably comprises a level of the first impurity that is not higher than that of the already-purified precipitate composition, and a level of the second impurity that is not higher than that of the already-purified precipitate composition either. The supplemental composition may be substantially free of the first impurity and the second impurity.

It should be appreciated that, to synthesize the final product (i.e. highly purified phosphate salt of M(Vb)), both a source of phosphate $PO_4$ and a source of metal M are needed in the method of the invention. The source of phosphate may be the precipitating composition, the oxidizing composition (if contains phosphoric acid), the supplemental composition (if any), or any combination thereof. The source of metal M may be the aqueous solution of the metal M(va) in step (i), the supplemental composition, or both. For example, $M(II)NH_4PO_4$ in the precipitate composition (e.g. a precipitate) can be oxidized to $M(III)PO_4$ without the need to supplement any P source material (e.g. phosphoric acid). In this case, the oxidizing composition and/or the supplemental composition (if any) do/does not need to contain any P source material such as phosphoric acid. However, when other M(II) precipitates such as $M(II)CO_3$, $M(II)(OH)_2$, and $M(II)C_2O_4$ in the precipitate composition (e.g. a precipitate) are oxidized to $M(III)PO_4$, supplement P source material (e.g. phosphoric acid) is needed from the oxidizing composition and/or the supplemental composition.

In some embodiments, the precipitating composition may not contain any phosphate salt or hydrogen phosphate salt. For example, the precipitating composition may include only a hydroxide of A, a carbonate of A, an oxalate salt of A, or any mixture thereof. In such embodiments, the precipitate composition may not include phosphate, and the method of the invention must include one or more other steps to supplement phosphate. For example, additional step (a) may be needed to provide a supplemental composition comprising a phosphoric acid, a phosphate salt of the metal having a first valence value, a hydrogen phosphate salt of the metal having a first valence value, a dihydrogen phosphate salt of the metal having a first valence value, or any mixture thereof. Alternatively or additionally, the oxidizing composition may function as a source of phosphate, or another source of phosphate.

In a specific embodiment as shown in FIG. 5, suitable precipitants (as the precipitating composition as described above) are added to precipitate the M source element or M source material. In the precipitation process, the valence or charge state of M is maintained when possible without further oxidization or with minimal oxidization. In one embodiment, the pH value of the solution in this step is maintained between 3.0 and 8.0. In one embodiment, the temperature of the solution in this step is maintained between room temperature to 70° C. The following reaction formula show certain embodiments of the present invention in the first stage:

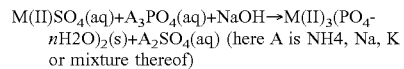

M(II)SO₄(aq)+A₃PO₄(aq)+NaOH→M(II)₃(PO₄-nH2O)₂(s)+A₂SO₄(aq) (here A is NH4, Na, K or mixture thereof)

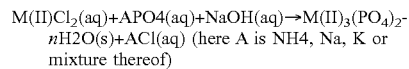

M(II)Cl₂(aq)+APO4(aq)+NaOH(aq)→M(II)₃(PO₄)₂-nH2O(s)+ACl(aq) (here A is NH4, Na, K or mixture thereof)

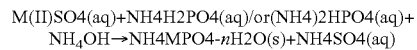

M(II)SO4(aq)+NH4H2PO4(aq)/or(NH4)2HPO4(aq)+NH₄OH→NH4MPO4-nH2O(s)+NH4SO4(aq)

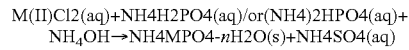

M(II)Cl2(aq)+NH4H2PO4(aq)/or(NH4)2HPO4(aq)+NH₄OH→NH4MPO4-nH2O(s)+NH4SO4(aq)

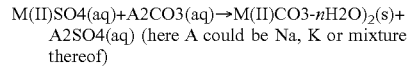

M(II)SO4(aq)+A2CO3(aq)→M(II)CO3-nH2O)₂(s)+A2SO4(aq) (here A could be Na, K or mixture thereof)

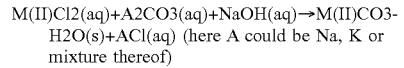

M(II)Cl2(aq)+A2CO3(aq)+NaOH(aq)→M(II)CO3-H2O(s)+ACl(aq) (here A could be Na, K or mixture thereof)

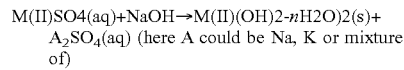

M(II)SO4(aq)+NaOH→M(II)(OH)2-nH2O)2(s)+A₂SO₄(aq) (here A could be Na, K or mixture of)

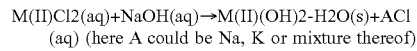

M(II)Cl2(aq)+NaOH(aq)→M(II)(OH)2-H2O(s)+ACl (aq) (here A could be Na, K or mixture thereof)

The S or/and Cl element/component in the liquid phase is removed by solid-liquid separation. The solid phase is further washed to remove remnant S and Cl. The solid precipitant includes the divalent M precipitation without further oxidization, and the content of S or/and C is very low. In this step, according to the requirements of the product and manufacturing process, the S or/and Cl may be controlled to be less than about 1000 ppm, or less than 500 ppm, or less than 200 ppm, or even lower than that.

In the second stage, one or more of water, P source compound, $P_2O_5$, phosphoric acid or its ammonium salt, hydrogen peroxide are added to the solid phase precipitant from which impurities have removed, and react under certain temperature, to produce MPO4:

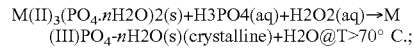

M(II)₃(PO₄-nH2O)2(s)+H3PO4(aq)+H2O2(aq)→M(III)PO₄-nH2O(s)(crystalline)+H2O@T>70° C.;

NH4MPO4-nH2O(s)+H3PO4(aq)+H2O2(aq)→M(III)PO₄-nH2O(s)(crystalline)+H2O @T>70° C.;

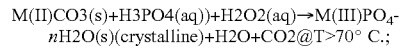

M(II)CO3(s)+H3PO4(aq))+H2O2(aq)→M(III)PO₄-nH2O(s)(crystalline)+H2O+CO2@T>70° C.;

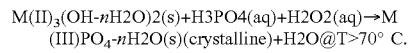

M(II)₃(OH-nH2O)2(s)+H3PO4(aq)+H2O2(aq)→M(III)PO₄-nH2O(s)(crystalline)+H2O@T>70° C.

In certain embodiments, the pH value of the solution in this stage is maintained between 1.0 and 2.0; and the temperature of the solution in this stage is maintained above 70, 80, 90, 95 or 100° C.

In this stage, according to the requirements of the product and manufacturing process, the S and Cl may be controlled to be less than about 100 ppm, or less than 80 ppm, or less than 50 ppm, or less than 20 ppm, or less than 10 ppm, or even lower than that.

EXAMPLES AND IMPLEMENTATIONS OF THE INVENTION

Without intent to limit the scope of the invention, exemplary methods and their related results according to the embodiments of the present invention are given below. Note again that titles or subtitles may be used in the examples for convenience of a reader, which in no way should limit the scope of the invention. Moreover, certain theories are proposed and disclosed herein; however, in no way they, whether they are right or wrong, should limit the scope of the invention.

Example 1 (Comparative Example)

Fifty mM aqueous solution of $FeSO_4$ was oxidized with hydrogen peroxide, in the presence of 55 mM 85% $H_3PO_4$, and with a pH adjusted to between 1 and 2 using NaOH, to yield amorphous $FePO_4 \cdot nH_2O$ precipitate slurry. The amorphous mixture was heated and maintained at constant reflux temperature with continuous stirring for 0.5 to 3 hours to yield crystallized $FePO4.2H2O$.

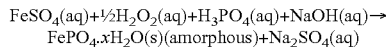
$FeSO_4(aq)+½H_2O_2(aq)+H_3PO_4(aq)+NaOH(aq) \rightarrow FePO_4 \cdot xH_2O(s)(amorphous)+Na_2SO_4(aq)$

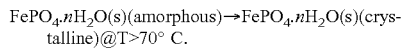
$FePO_4 \cdot nH_2O(s)(amorphous) \rightarrow FePO_4 \cdot nH_2O(s)(crystalline)@T>70°$ C.

The product was separated by filtration to remove the majority of impurities S and Na. The residual impurities were then removed by washing with a big amount of DI water. Using around 500 ml of water for continuous filtration can reduce the impurities to 2000 ppm level. Using 500 ml more water can reduce the impurities to 1000 ppm level. Using 500 ml even more water can reduce the impurities to 700 ppm level. This can go one and on, as more and more water is needed to further decrease the level of impurities.

In the following Examples 2-8, the amount of water used was much lower than that in Example 1. Moreover, the level of impurity S and Na in the final product can be controlled lower than that in Example 1.

Example 2: from $NH_4FePO_4 \cdot H_2O$ to $FePO_4 \cdot 2H_2O$ 50 mM $FeSO_4 \cdot 7H_2O$ and 50 mM $NH_4HPO_4$ were weighted and dissolved into 100 ml of distilled water in a 500-ml triangular beaker. $NH_3 \cdot H_2O$ solution was then added drop wise into the triangular beaker at a constant rate to adjust pH to a range of from 6.0 to 7.5. $NH_4FePO_4 \cdot H_2O$ was precipitated as green material from the solution.

Figure 6:
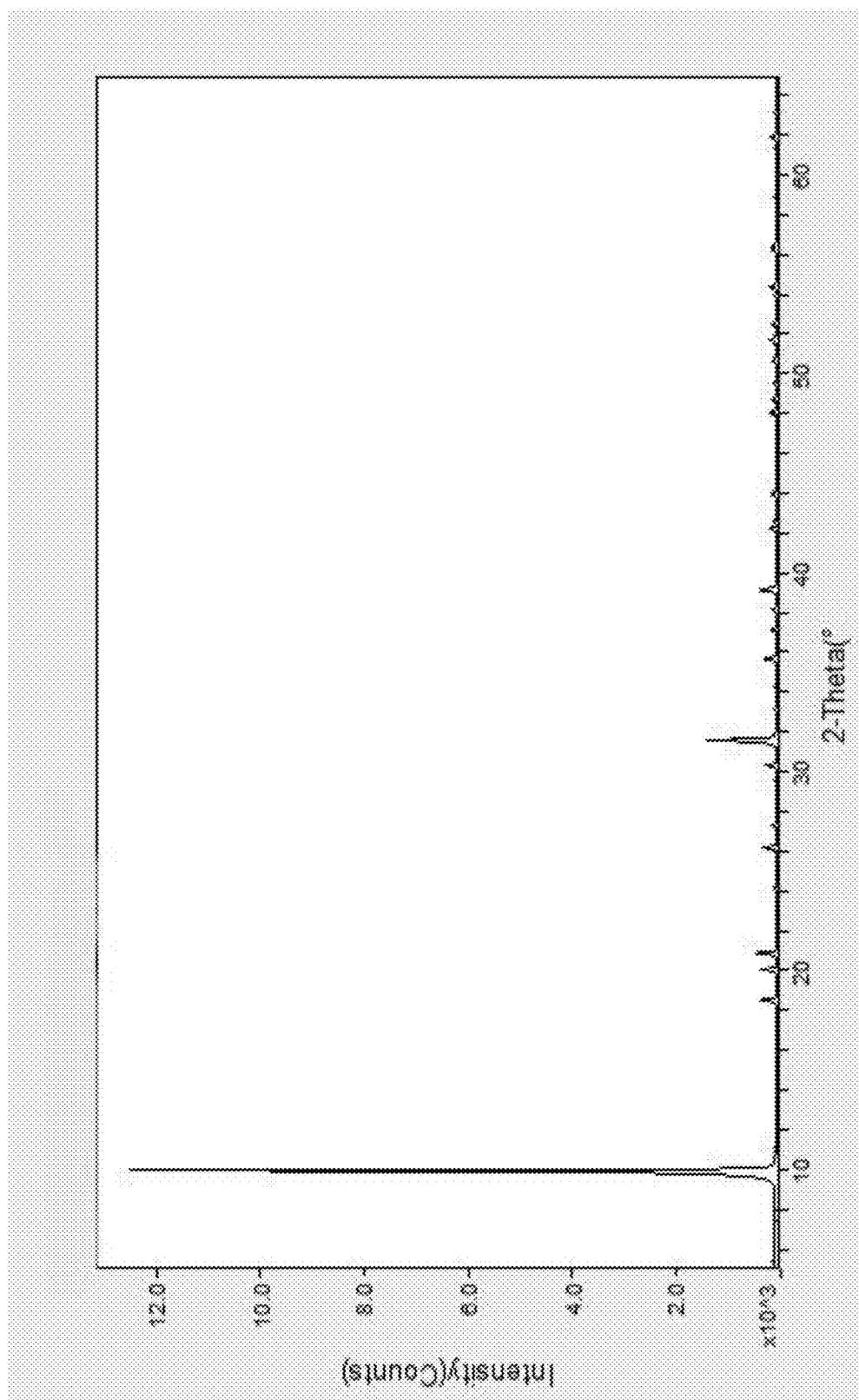
FIG. 6 shows an X-ray diffraction pattern of NH4FePO4.H2O in accordance with an exemplary embodiment of the present invention.

The solid phase NH4FePO4.H2O was separated from the liquid phase by filtration. The majority of the S impurity was gone with the liquid phase. The residual impurities were then removed by washing the solid phase NH4FePO4.H2O with 250 ml of DI water with continuous filtration, and S impurity was decreased below 500 ppm. FIG. 6 shows an X-ray diffraction pattern of NH4FePO4.H2O.

The washed NH4FePO4.H2O was placed back into 100 mL DI water, and was then stirred and heated. At the same time, hydrogen peroxide was added dropwise into the mixture to make all Fe(II) turn to Fe(III), and pH was adjusted to 1.5 with H3PO4.

Figure 8:
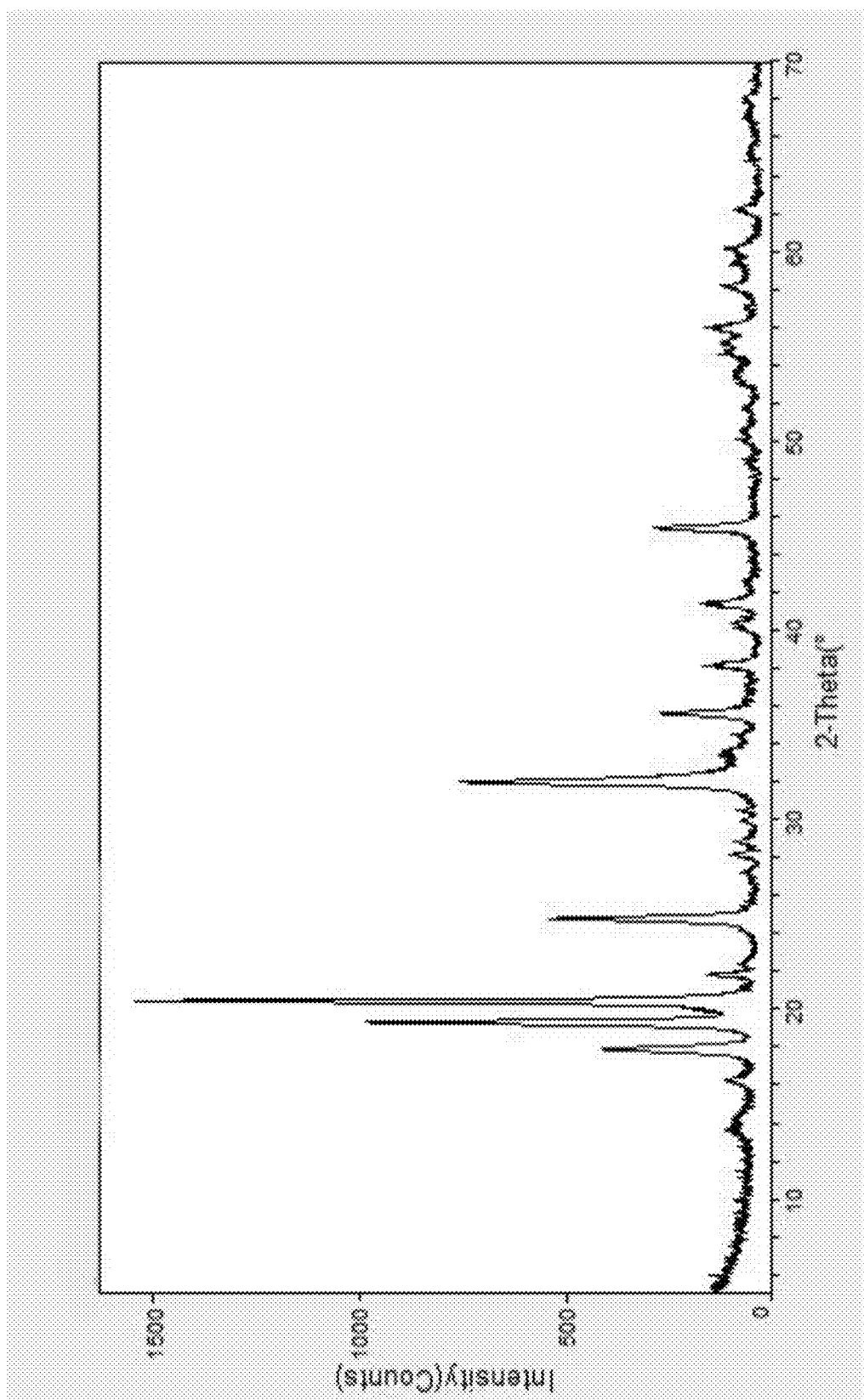
FIG. 8 shows an X-ray diffraction pattern of FePO4.2H2O in accordance with an exemplary embodiment of the present invention.
Figure 9:
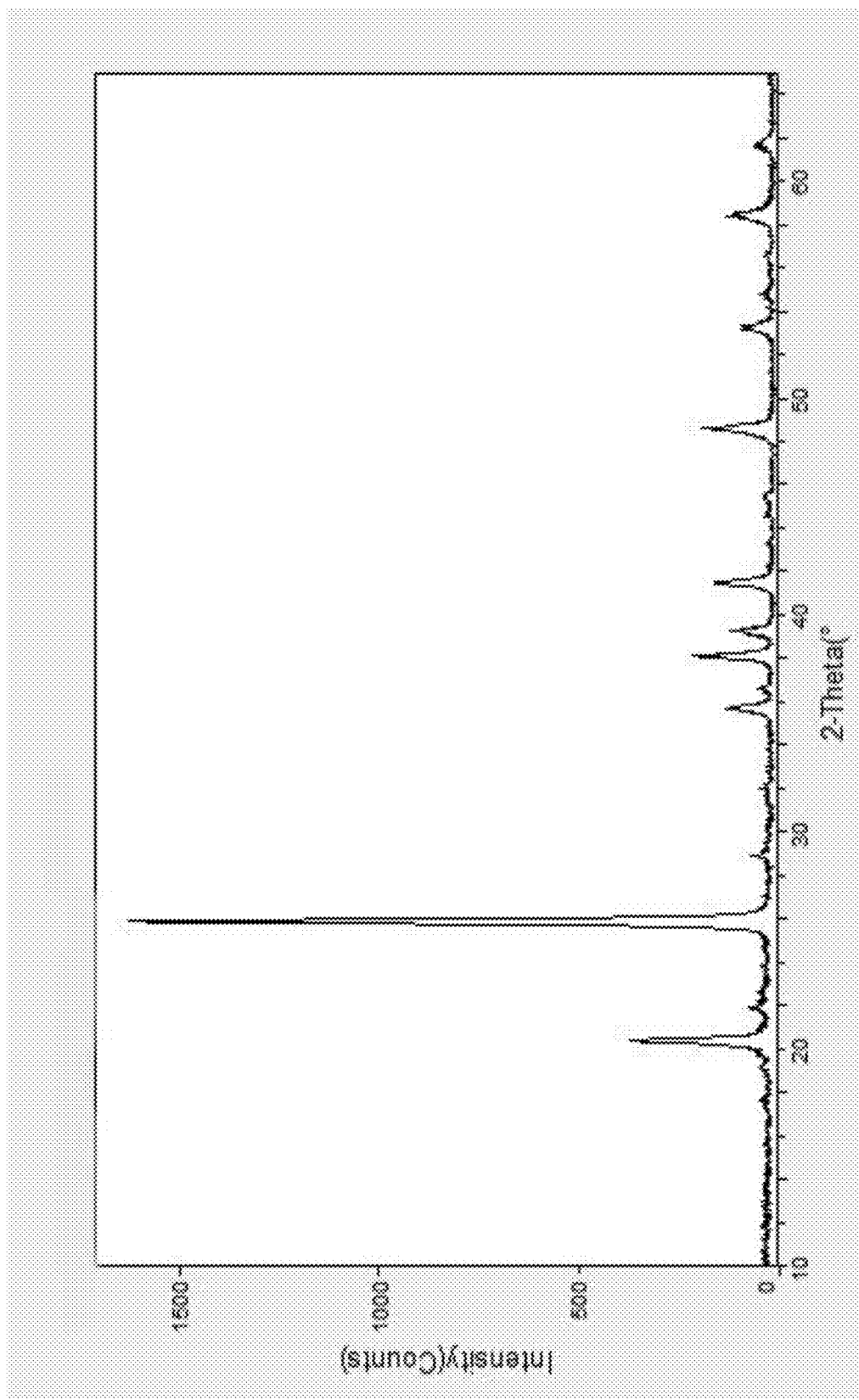
FIG. 9 shows an X-ray diffraction pattern of $FePO_4$ anhydrated in accordance with an exemplary embodiment of the present invention.

The mixture was heated to, and maintained at, constant reflux temperature with continuous stirring for 0.5 to 3 hours to yield crystallized FePO4.2H2O. The product was separated by filtration, simply washed with 50 mL DI water during continuous filtration, and then dried in an oven at 105° C. for 3 hours to obtain FePO4.2H2O product with 120 ppm of S impurity. FIG. 8 shows an X-ray diffraction pattern of FePO4.2H2O. The product $FePO_4 \cdot 2H_2O$ was then heated in an oven at 550° C. for 3 hours to yield anhydrated FePO4. FIG. 9 shows an X-ray diffraction pattern of $FePO_4$ anhydrated.

Example 3: from $Fe(OH)_2$ to $FePO_4 \cdot 2H_2O$ 50 mM FeSO4.7H2O was weighted and dissolved into 100 ml of distilled water in a 500 ml triangular beaker. 1M NaOH solution was then added drop wise into the triangular beaker at a constant rate to adjust pH to 6.0-7.5. Bluish Fe(OH)2 was precipitated from the solution.

The solid phase Fe(OH)2 was separated from the liquid phase by filtration. The majority of the S impurity was gone with the liquid phase. The residual impurities was then removed by washing the solid phase Fe(OH)2 with 300 ml of DI water with continuous filtration, decreasing S and Na impurities below 1000 ppm.

The washed Fe(OH)2 was put back into 100 mL DI water containing 55 mM 85% H3PO4, and was stirred and heated. At the same time, hydrogen peroxide was added dropwise into the mixture to convert all Fe(II) turn to Fe(III), and pH was adjusted to 1.5 with H3PO4.

The mixture was heated to and maintained at constant reflux temperature with continuous stirring for 0.5 to 3 hours to yield crystallized FePO4.2H2O. The product was separated by filtration, and simply washed with 50 mL DI water in continuous filtration. The product was then dried in an oven at 105° C. for 3 hours to obtain FePO4.2H2O product containing only 180 ppm of S and Na impurities combined. FIG. 8 shows an X-ray diffraction pattern of FePO4.2H2O. The product $FePO_4 \cdot 2H_2O$ was then heated in an oven at 550° C. for 3 hours to yield anhydrated $FePO_4$. FIG. 9 shows an X-ray diffraction pattern of $FePO_4$ anhydrated.

Example 4: from $Fe_3(PO_4)_2 \cdot 8H_2O$ to $FePO_4 \cdot 2H_2O$ 50 mM FeSO4.7H2O and 30 mM H3PO4 were weighted and dissolved into 100 ml of distilled water in a 500 ml triangular beaker. 35 mM H3PO4 solution was added into the beaker, and certain amount of 1M NaOH solution was then added drop wise into the triangular beaker at a constant rate to adjust pH between 6.0 and 7.5. Bluish Fe3(PO4)2.8H2O was precipitated from the solution.

Figure 7:
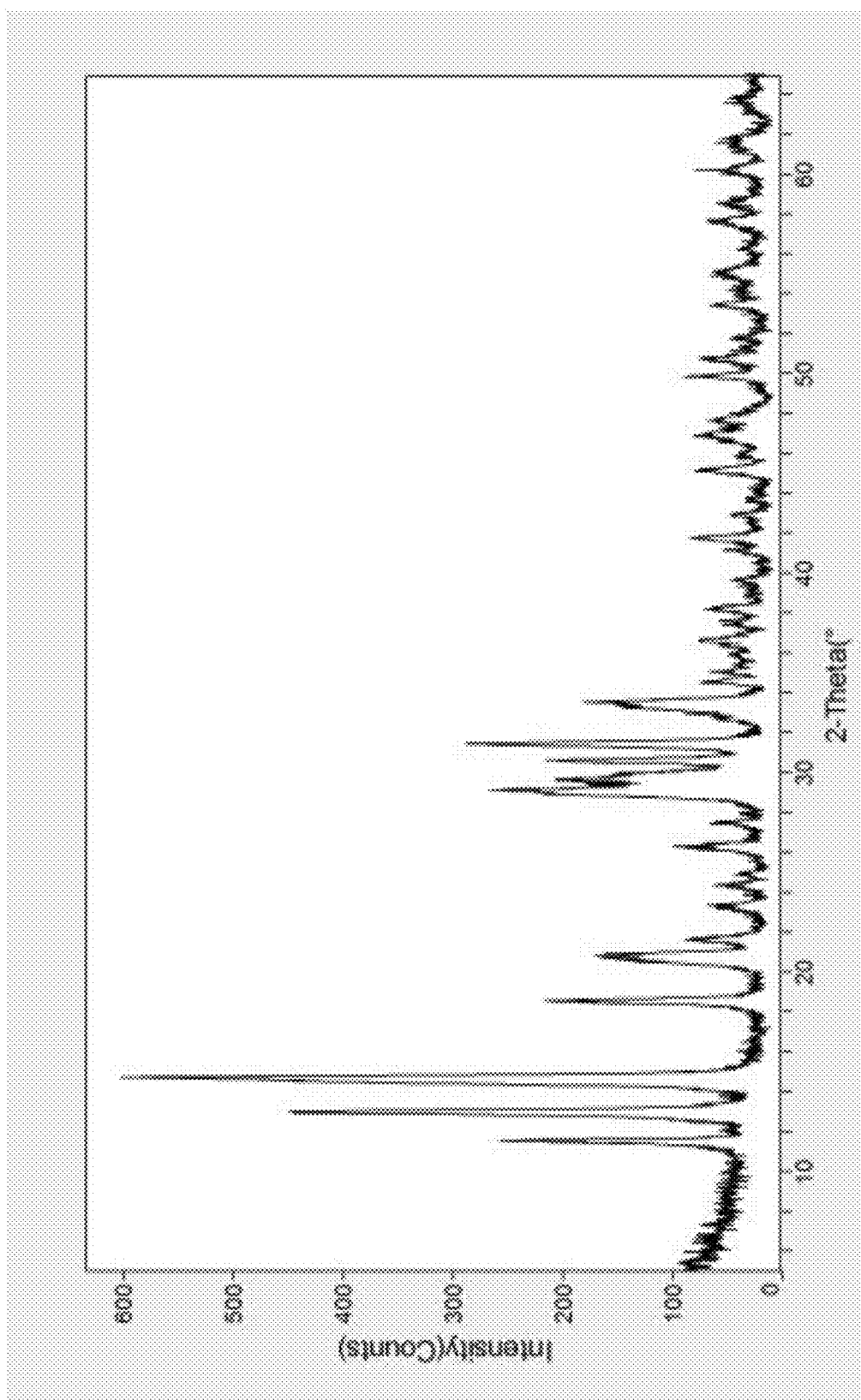
FIG. 7 shows an X-ray diffraction pattern of $Fe_3(PO_4)_2 \cdot 8H_2O$ in accordance with an exemplary embodiment of the present invention.

The solid phase Fe3(PO4)2.8H2O was separated from the liquid phase by filtration. The majority of the S and Na impurities were gone with the liquid phase. The residual impurities was then removed by washing the solid phase $Fe3(PO_4)_2$ with 300 ml DI water by continuous filtration, decreasing S and Na impurities below 1000 ppm. FIG. 7 shows an X-ray diffraction pattern of $Fe_3(PO_4)_2 \cdot 8H_2O$.

The washed Fe3(PO4)2.8H2O was put back to 100 mL DI water in a 500 ml beaker, and 25 mM H3PO4 was added into the beaker. The mixture was stirred and heated, and at the same time, hydrogen peroxide was added dropwise into the mixture to oxidize all Fe(II) to Fe(III), and pH was adjusted to 1.5 with H3PO4. The mixture was heated and maintained at constant reflux temperature with continuous stirring for 0.5 to 3 hours to yield crystallized FePO4.2H2O.

The product was separated by filtration, by simply washing with 50 mL DI water in continuous filtration, and by drying in an oven at 105° C. for 3 hours, to obtain FePO4.2H2O product with only 180 ppm of the S and Na impurities combined. FIG. 8 shows an X-ray diffraction pattern of FePO4.2H2O. The product FePO$_4$.2H$_2$O was then heated in an oven at 550° C. for 3 hours to yield anhydrated FePO$_4$. FIG. 9 shows an X-ray diffraction pattern of FePO$_4$ anhydrated.

Example 5: Fe(OH)$_2$ 50 mM FeSO$_4$.7H$_2$O was weighted and dissolved into 100 ml of distilled water in a 500 ml triangular beaker. 1M NaOH solution was then added drop wise into the triangular beaker at a constant rate to adjust pH between 6.0 and 7.5. Bluish Fe(OH)$_2$ was precipitated from the solution.

The solid phase Fe(OH)$_2$ was separated from the liquid phase by filtration. The majority of the S impurity was gone with the liquid phase. The residual impurity was then removed by washing the solid phase Fe(OH)$_2$ with DI water and repeated filtration, until S and Na impurities were below 1000 ppm combined.

Example 6: NH$_4$MnPO$_4$.H$_2$O 50 mM MnSO4 and 50 mM NH4H2PO4 were weighted and dissolved into 100 ml of distilled water in a 500 ml triangular beaker. NH3.H2O solution was then added drop wise into the triangular beaker at a constant rate to adjust pH between 6.0 and 7.5. Bluish NH$_4$MnPO$_4$.H$_2$O was precipitated from the solution.

Figure 10:
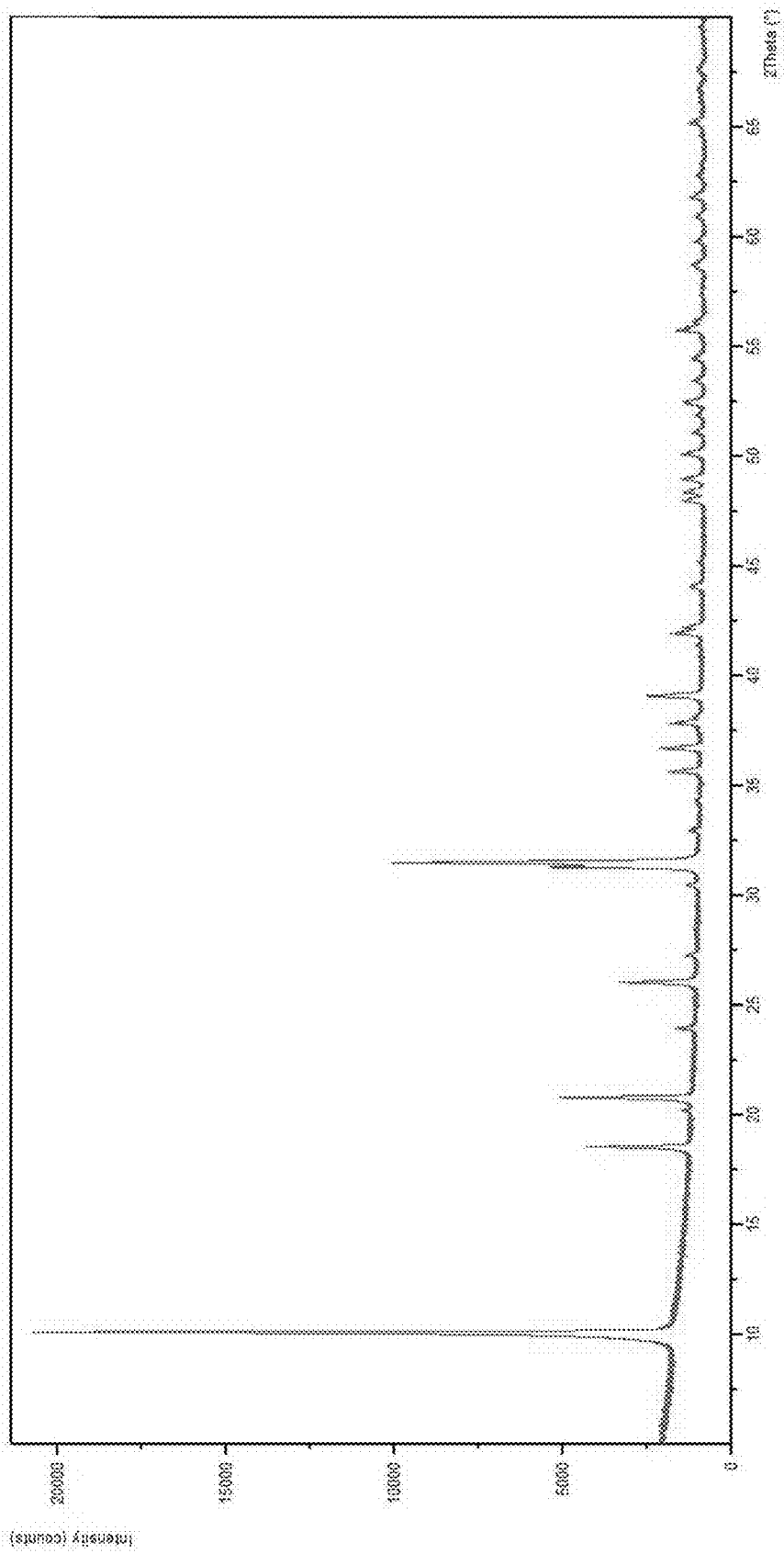
FIG. 10 shows an X-ray diffraction pattern of $NH_4MnPO_4 \cdot H_2O$ in accordance with an exemplary embodiment of the present invention.

The solid phase NH$_4$MnPO$_4$.H$_2$O was separated from the liquid phase by filtration. The majority of the S impurity was gone with the liquid phase. The residual impurity was then removed by washing the solid phase NH$_4$MnPO$_4$.H$_2$O with DI water and with the repeated filtration, until the level of S impurity was below 500 ppm. FIG. 10 shows an X-ray diffraction pattern of NH$_4$MnPO$_4$.H$_2$O.

Example 7: from Fe(OH)$_2$ and NH$_4$MnPO$_4$.H$_2$O to FexMn(1-x)PO$_4$.nH2O

The washed Fe(OH)$_2$ from Example 5, the washed NH$_4$MnPO$_4$.H$_2$O from Example 6, and 55 mM 85% H3PO4 were mixed into 200 mL DI water. The mixture was stirred and heated, and at the same time, hydrogen peroxide was added drop wise into the mixture to convert all Fe(II) turn to Fe(III). The pH was adjusted to 1.5 with H3PO4 at this point.

Figure 11:
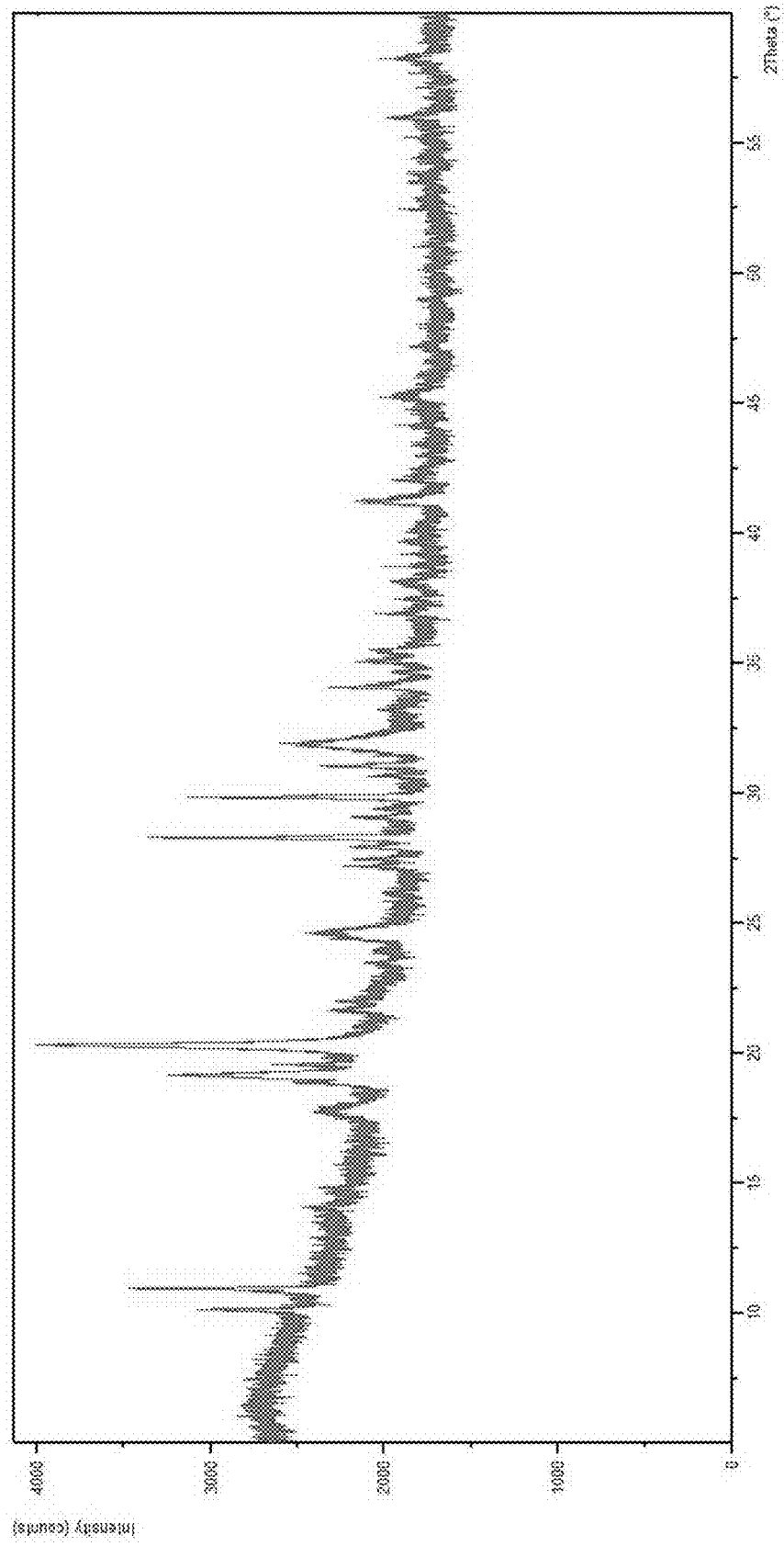
FIG. 11 shows an X-ray diffraction pattern of $Fe_xMn(1-x)PO_4 \cdot nH_2O$ in accordance with an exemplary embodiment of the present invention.

The mixture was heated and maintained at constant reflux temperature with continuous stirring for 0.5 to 3 hours to yield crystallized FexMn(1-x)PO$_4$.nH2O. The product was separated by filtration, and then by simple washing. The product was then dried in an oven at 105° C. for 3 hours to obtain FexMn(1-x)PO$_4$.nH2O product. FIG. 11 shows an X-ray diffraction pattern of FexMn(1-x)PO$_4$.nH2O.

Example 8: from (Fe+H3PO4) and Fe(OH)$_2$ to FePO4.2H2O 2 g pure Fe metal was added to 100 ml 55 mM H3PO4 solution in a 300 ml beaker. The H3PO4 solution with Fe metal was stirred and heated to temperature of 85° C. The reaction was stopped at pH 2.0. Green Fe2(PO$_4$)3.nH2O clear solution was obtained after filtering out any residual Fe metal. The washed Fe(OH)$_2$ from Example 5 was then mixed to the green solution. The mixture was stirred and heated, and in the meanwhile, hydrogen peroxide was added dropwise into the mixture to oxidize all Fe(II) turn to Fe(III). The pH value was adjusted to 1.5 by H3PO4. The mixture was heated and maintained at constant reflux temperature with continuous stirring for 0.5 to 3 hours to yield crystallized FePO4.2H2O. The product was separated by filtration, simply washing with 50 mL DI water with continuous filtration. The product was dried in an oven at 105° C. for 3 hours to obtain FePO4.2H2O product containing 120 ppm of the S and Na impurities combined.

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

The invention claimed is:

1. A method of synthesizing a phosphate salt of a metal M, comprising:
    (i) providing an aqueous solution of the metal M having a first valence value Va, wherein the aqueous solution contains a first impurity Ta;
    (ii) adding a precipitating composition containing a second impurity Tb to the aqueous solution to form a mixture of a liquid phase and a precipitate composition comprising one or more water-insoluble compounds of the metal having a first valence value M(Va), wherein the liquid phase contains both the first impurity Ta and the second impurity Tb;
    (iii) separating the precipitate composition and the liquid phase, wherein a residual amount of the first impurity Ta and the second impurity Tb remains in the precipitate composition after the separation;
    (iv) decreasing the residual amount of the first impurity Ta and the second impurity Tb present in the precipitate composition; and
    (v) oxidizing the metal having a first valence value M(Va) in the precipitate composition with an oxidizing composition to produce a phosphate salt of the metal having a second valence value Vb, wherein the second valence value Vb is greater than the first valence value Va, and wherein said phosphate salt of the metal having the second valence value Vb contains 50-500 ppm of the first impurity and the second impurity combined.

2. The method according to claim 1, wherein the metal is Fe, Co, Ni, Mn, Ti, V, or any combination thereof.

3. The method according to claim 1, wherein said aqueous solution of the metal having a first valence value in step (i) includes a sulfate salt of the metal having a first valence value, a chloride salt of the metal having a first valence value, or any mixture thereof, and wherein said first impurity is S, Cl, or any mixture thereof.

4. The method according to claim 1, wherein said precipitating composition comprises a phosphate salt of A, a hydrogen phosphate salt of A, a hydroxide of A, a carbonate of A, an oxalate salt of A, or any mixture thereof, wherein A is Li, Na, K, Rb, Cs, NH$_4$, or any mixture thereof.

5. The method according to claim 1, wherein said second impurity is Li, Na, K, Rb, Cs, $NH_4$, or any mixture thereof.

6. The method according to claim 1, wherein said one or more water-insoluble compounds of the metal having a first valence value comprises a phosphate salt of the metal, a hydrogen phosphate salt of the metal, a hydroxide of the metal, a carbonate of the metal, an oxalate salt of the metal, the metal salt of $NH_4PO_4^{2-}$, or any mixture thereof.

7. The method according to claim 1, wherein step (ii) is a precipitation reaction; and the reaction mixture has a pH greater than 4.

8. The method according to claim 1, the residual amount of the first impurity and the second impurity that remains in the precipitate composition after the separation is less than 40%, 30%, 20%, 10%, or 5% of the total amount of the first impurity and the second impurity in the reaction mixture before the separation.

9. The method according to claim 1, wherein said decreasing the residual amount of the first impurity and the second impurity present in the precipitate composition is carried out by washing said one or more water-insoluble compounds of the metal having a first valence value with DI water for one or more times until the total amount of the first impurity and the second impurity present in the precipitate composition is lower than a predetermined level.

10. The method according to claim 1, wherein said oxidizing the metal is carried out with the oxidizing composition at a temperature greater than 50° C.

11. The method according to claim 10, wherein said oxidizing composition comprises hydrogen peroxide, phosphoric acid, and water.

12. The method according to claim 1, wherein reaction mixture in step (v) has a pH in the range of 0.5 to 4.0.

13. The method according to claim 1, wherein said precipitating composition, said oxidizing composition, or both function as a source of P element in the final product.

14. The method according to claim 1, further comprising:
(a) reacting the metal in substantially pure element form with phosphoric acid to produce a supplemental composition comprising a phosphoric acid, a phosphate salt of the metal having a first valence value, a hydrogen phosphate salt of the metal having a first valence value, a dihydrogen phosphate salt of the metal having a first valence value, or any mixture thereof; and
(b) mixing the supplemental composition with the precipitate composition after step (iv), but before step (v) and/or during step (v).

15. The method according to claim 14, wherein said precipitating composition, said oxidizing composition, said supplemental composition, or any combination thereof functions as a source of P element in the final product.

16. The method according to claim 1, comprising:
(i-1) providing a first aqueous solution of a first metal $M_1$ having a first valence value Va1 [M1(Va1)], wherein the first aqueous solution contains a first impurity Ta1;
(ii-1) adding a first precipitating composition containing a second impurity Tb1 to the first aqueous solution to form a mixture of a first liquid phase and a first precipitate composition comprising one or more water-insoluble compounds of the metal having a first valence value M1(Va1), wherein the first liquid phase contains both the first impurity Ta1 and the second impurity Tb1;
(iii-1) separating the first precipitate composition and the first liquid phase, wherein a residual amount of the first impurity Ta1 and the second impurity Tb1 remains in the first precipitate composition after the separation,
(iv-1) decreasing the residual amount of the first impurity Ta1 and the second impurity Tb1 present in the first precipitate composition,
(i-2) providing a second aqueous solution of a second metal M2 having a first valence value Va2 [M2(Va2)], wherein the second aqueous solution contains a first impurity Ta2;
(ii-2) adding a second precipitating composition containing a second impurity Tb2 to the second aqueous solution to form a mixture of a second liquid phase and a second precipitate composition comprising one or more water-insoluble compounds of the second metal having a first valence value M2(Va2), wherein the second liquid phase contains both the first impurity Ta2 and the second impurity Tb2;
(iii-2) separating the second precipitate composition and the second liquid phase, wherein a residual amount of the first impurity Ta2 and the second impurity Tb2 remains in the second precipitate composition after the separation;
(iv-2) decreasing the residual amount of the first impurity Ta2 and the second impurity Tb2 present in the second precipitate composition;
(pre-v) mixing the first precipitate composition obtained from (iv-1) and the second precipitate composition obtained from (iv-2) to form a mixed precipitate composition; and
(v) oxidizing the first metal and the second metal having their first valence values M1(Va1) and M2(Va2) in the mixed precipitate composition with an oxidizing composition to produce a phosphate co-salt of the first metal and the second metal having their second valence values M1(Vb1) and M2(Vb2), wherein the second valence value Vb1 is greater than the first valence value Va1, and wherein the second valence value Vb2 is greater than the first valence value Va2.

17. The method according to claim 16, further comprising:
(A) reacting the metals M1 and/or M2 in substantially pure element form with phosphoric acid to produce a supplemental composition comprising phosphoric acid, a phosphate salt of the first metal M1 having a first valence value Va1, a hydrogen phosphate salt of the first metal M1 having a first valence value Va1, a dihydrogen phosphate salt of the first metal M1 having a first valence value Va1, a phosphate salt of the second metal M2 having a first valence value Va2, a hydrogen phosphate salt of the second metal M2 having a first valence value Va2, a dihydrogen phosphate salt of the second metal M2 having a first valence value Va2, or any mixture thereof; and
(B) mixing the supplemental composition with the mixed precipitate composition after step (pre-v), but before step (v) and/or during step (v).

18. The method according to claim 1, wherein said phosphate salt of the metal having a second valence value is in crystal form, amorphous form, or mixture thereof.

19. The method according to claim 1, wherein said phosphate salt of the metal having a second valence value is $Fe_xMn_{(1-x)}PO_4$, wherein $0 \leq x \leq 1$.

* * * * *